(12) United States Patent
Gajewski

(10) Patent No.: US 7,076,408 B1
(45) Date of Patent: Jul. 11, 2006

(54) METHOD FOR ENSURING CONSISTENT PROTOCOL IN THE LOCATION OF CIRCUITS AND CONNECTORS HAVING MULTIPLE CIRCUIT-RECEIVING CAVITIES

(75) Inventor: Michael W. Gajewski, Troy, MI (US)

(73) Assignee: Yazaki North America, Canton, MI (US)

( * ) Notice: Subject to any disclaimer, the term of this patent is extended or adjusted under 35 U.S.C. 154(b) by 826 days.

(21) Appl. No.: 10/116,178

(22) Filed: Apr. 3, 2002

(51) Int. Cl.
*G06F 7/60* (2006.01)

(52) U.S. Cl. .............................. 703/2; 439/43; 439/49; 439/55; 439/76.2

(58) Field of Classification Search ................ 382/100; 702/151; 307/147; 709/230; 439/1–894; 710/315
See application file for complete search history.

(56) References Cited

U.S. PATENT DOCUMENTS

| | | | | |
|---|---|---|---|---|
| 4,041,547 | A | * | 8/1977 | Loose .......................... 361/778 |
| 5,535,342 | A | * | 7/1996 | Taylor ......................... 710/315 |
| 5,592,881 | A | * | 1/1997 | Rabjohns ..................... 101/483 |
| 5,610,454 | A | * | 3/1997 | Nishikawa et al. .......... 307/147 |
| 5,973,951 | A | * | 10/1999 | Bechtolsheim et al. ....... 365/52 |
| 6,273,751 | B1 | * | 8/2001 | Francaviglia ................ 439/511 |
| 6,614,914 | B1 | * | 9/2003 | Rhoads et al. .............. 382/100 |
| 2002/0013148 | A1 | * | 1/2002 | Matsumura .................. 455/423 |
| 2003/0100228 | A1 | * | 5/2003 | Bungo et al. ............... 439/701 |
| 2004/0193385 | A1 | * | 9/2004 | Yutkowitz .................... 702/151 |
| 2004/0199652 | A1 | * | 10/2004 | Zou et al. .................... 709/230 |
| 2005/0094848 | A1 | * | 5/2005 | Carr et al. ................... 382/100 |

OTHER PUBLICATIONS

A Painless Guide to CRC Error Detection Algorithms.

* cited by examiner

*Primary Examiner*—Kamini Shah
*Assistant Examiner*—Cuong Van Luu
(74) *Attorney, Agent, or Firm*—Young & Basile, P.C.

(57) ABSTRACT

A method of reducing the record of a multi-cavity terminal connector comprising the steps of assigning cavity numbers and locations to a properly oriented, full-scale CAD graphic of the connector, creating an integer from a concatenation of the cavity numbers and coordinates and performing a mathematical operation on the integer, such as a cyclical redundancy check, to produce a code which is substituted for the graphic in the connector record.

9 Claims, 5 Drawing Sheets

| 1 | 0 | 10 |
|---|---|---|
| 2 | 10 | 9 |
| 3 | 22 | 8 |
| 4 | 7 | 13 |
| 5 | 16 | 11 |
| 6 | 25 | 9 |

UNPROCESSED INTEGER CODE IS:

10102109322847135161116259

PROCESSED CODE IS:

5643512

STEP 1

STEP 2

STEP 3

STEP 4

STEP 5

| 1 | 0 | 10 |
|---|---|---|
| 2 | 20 | 8 |
| 3 | 30 | 7 |
| 4 | 40 | 6 |
| 5 | 50 | 6 |

UNPROCESSED INTEGER CODE IS:

10102208330744065506

PROCESSED CODE IS:

| TEMP CONTROL & ILLUM ||||| 
|---|---|---|---|---|
| CAV NUM | CIR NAME | GA | COLOR | MS |
| 1 | Z11A | 20 | BK/WT | T |
| 2 | C36 | 20 | DB/RD | S |
| 3 | F24A | 20 | RD/DG | S |
| 4 | E2C | 20 | OR | S |
| 5 | Z1F | 20 | BK | S |

NUMBERS

LETTERS

MATRIX

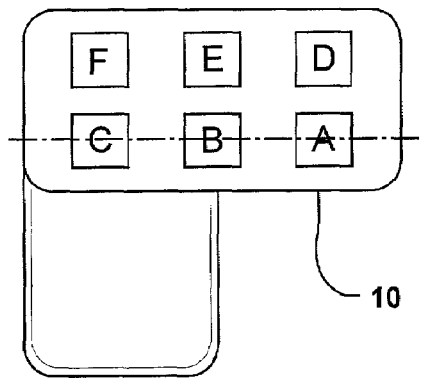
FIG - 12
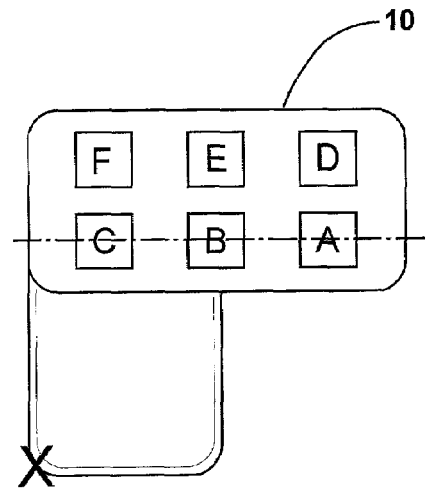
FIG - 13
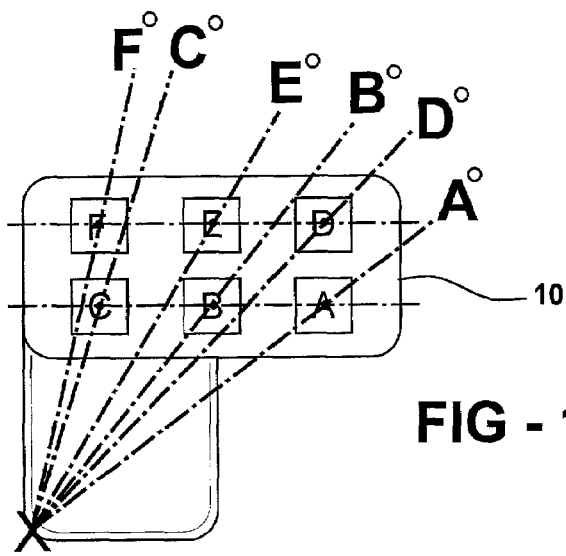
FIG - 14
FIG - 15
| 1 | 0 | 10 |
|---|---|---|
| 2 | 10 | 9 |
| 3 | 22 | 8 |
| 4 | 7 | 13 |
| 5 | 16 | 11 |
| 6 | 25 | 9 |
UNPROCESSED INTEGER CODE IS:
10102109322847135161 16259
PROCESSED CODE IS:
5643512

METHOD FOR ENSURING CONSISTENT PROTOCOL IN THE LOCATION OF CIRCUITS AND CONNECTORS HAVING MULTIPLE CIRCUIT-RECEIVING CAVITIES

FIELD OF THE INVENTION

This invention relates to the design of multi-circuit electrical connectors and more particularly to the generation and communication of a record describing an electrical connector having multiple circuit-receiving cavities without the necessity of using a graphic representation of the connector in the record.

BACKGROUND OF THE INVENTION

Automobile wiring harnesses typically comprise trunks and branches of bundled wires assigned to individual circuits. The bundles of wires terminate at both ends and at branch ends in connectors having multiple internal cavities for receiving terminal devices of either male or female types. A particular connector may, for example, receive and provide terminations for five different sets of wires representing five different circuits and, therefore, having five cavities within the connector which open to the terminal end of the connector; i.e., the outside end of the connector which is coupled to another connector to provide continuity for each of the five circuits. Each connector, therefore, has a "wire end;" i.e., the end into which the wires for the circuits enter, and a "terminal end;" i.e., the outside end of the connector described above.

FIG. 1 is a graphic of a typical wiring harness connector 10 viewed from the terminal end. The connector 10 has cavities 12 arranged and numbered 1, 2, 3, 4 and 5 from left to right when viewed from the terminal end. The chart 14 on the right side of FIG. 1 contains information pertaining to the circuits which are represented by the cavities 12 in the connector 10. The left column is the "cavity number," the next column to the right is the "circuit name," the next column to the right shows the wire gauge number, the next column to the right shows the color or colors of the wire and the far right column may be a manufacturer code. Both the graphic on the left side of FIG. 1 and the table on the right side of FIG. 1 are typically included on the record which is exchanged between persons dealing with the connector 10. The term "record," as used herein, may be a drawing, an electronic file or a combination of same.

It is, of course, important that persons participating in the design, installation and/or use of circuits associated with or connected to the harness which includes connector 10 adopt the same protocol with respect to the identification of the cavities 12 and the circuits to be associated therewith. If, for example, one company adopted the numbering convention of FIG. 1 and a second company were to approach the matter by viewing the connector 10 from the wire end, cavity numbers would be reversed even though both companies number the cavities from left to right.

As indicated above, the best known way to avoid this problem currently is to include the graphic in the record. However this adds to the overhead cost of creating, storing and communicating records between persons and/or firms working on a project involving one or more connectors in wiring harnesses and the like.

SUMMARY OF THE INVENTION

My invention is a method of assuring a consistent designation of cavities in a wiring harness connector having multiple circuit-receiving cavities so as to essentially eliminate the need to create, maintain and communicate a record containing a connector graphic between persons or firms working on a coordinated project. In brief I create a code number which is derived from cavity identification and location information and is added to the record. This code number can be compared by persons receiving the record to the code number carried in their own record. If the two code numbers are identical, the two persons or firms communicating information to one another about circuits in a multiple cavity connector are assured that they are using the same cavity location identification protocol and are, therefore, less likely to miswire circuits in their respective products.

In general I generate my code number by creating a full-scale graph of the connector and by defining a numerical coordinate system and assigning all of the cavities in a multiple cavity connector different numerical identities. Thereafter, I numerically define the locations of all of the cavities of the connector in the defined coordinate system. Using the numerical identities and the coordinates of the cavities I create an integer containing a series of digits and I perform a mathematical operation on this integer to produce a unique code which I place in the record along with the identification of the connector and the circuits therein. All that is necessary to assure a recipient of this record that he and I are using the same cavity location identification protocol is to compare the code number in my record with the code number in his record. If they are the same, then the cavity location identification protocols must be the same.

In the preferred embodiment of my method hereinafter described in detail, I perform a number of sub-steps to orient a graphic such as a CAD drawing of the terminal end of the conductor within a polar coordinate system. I preferably add digits to the radian or angle values to give them a higher resolution. Thereafter, I create an integer by concatenating cavity identity and coordinate numbers. The mathematical operation which I prefer to perform on my concatenated integer is a CRC method to produce a unique code which is unlikely to be repeated by similar processing of cavity identification and coordinate location numbers from a differently coded connector.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a table of simplified coordinates;

FIG. 8 is a representation of a new record for the connector 10 containing the same information as is contained in FIG. 1 but without the graphic portion;

FIG. 12 is a reproduction of the terminal graphic FIG. 9B after an inverted step to place detail 22 in the lower half of the facsimile;

FIG. 13 is a reproduction of the terminal graphic in the inverted condition and with the additional step of locating the origin of a coordinate system to be used in locating cavity centers;

FIG. 14 is a representation of the terminal graphic with the superimposition of a polar coordinate locating system; and FIG. 15 is table of simplified coordinates for FIG. 9B, the corresponding unprocessed integer, and the processed code.

DESCRIPTION OF THE PREFERRED EMBODIMENT

Figure 1:
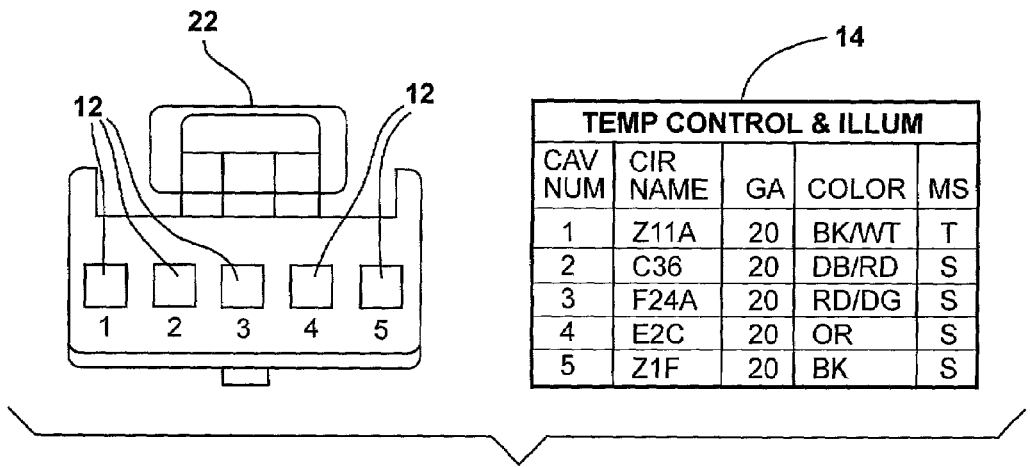
FIG. 1 is a prior art representation of a graphic and a table described in connector 10 having five cavities 12.

Referring to the FIGS. I illustrate my method with reference to the connector 10 of FIG. 1 having five cavities numbered 1 through 5 from left to right as viewed from the terminal end and with a detail 22 of the connector 10 at the top. The conventional record for this connector includes the graphic portion shown on the left and a table 14 shown on the right.

Figure 2:
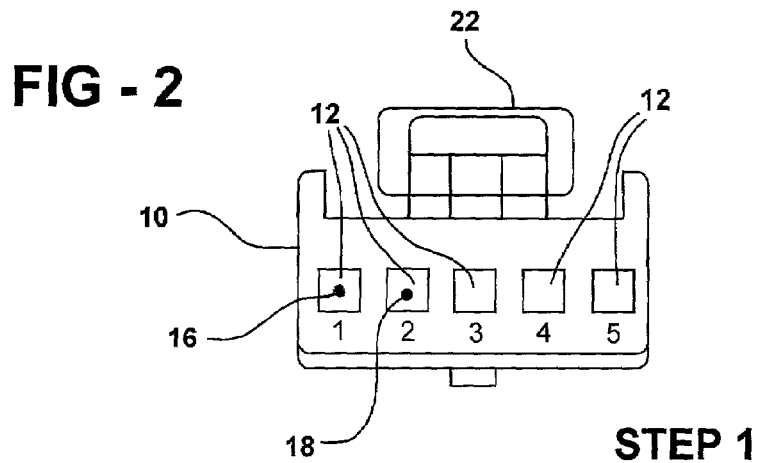
FIG. 2 is a reproduction of the graphic portion of FIG. 1 with the additional step of locating the centers of cavities 1 and 2.
Figure 3:
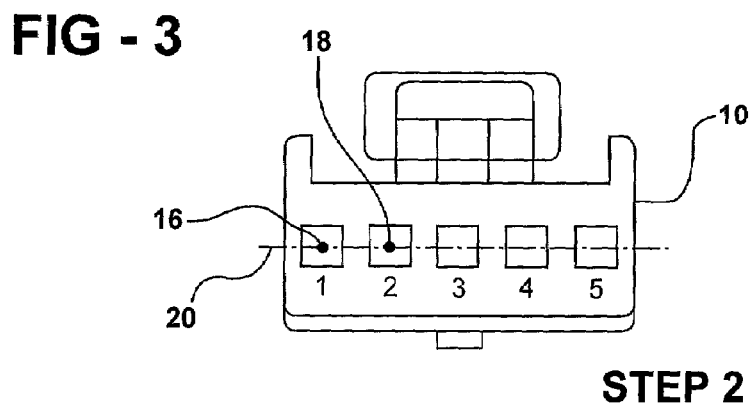
FIG. 3 is a reproduction of the graphics portion of FIG. 1 with the additional step of having drawn a line through the centers of cavities 1 and 2.

The first step of my method is performed using a full-scale CAD facsimile or representation of the connector 10 viewed from the terminal end on the screen of a computer monitor as shown in FIG. 2. Using the tools which are associated with a typical drafting computer I find the centers 16 and 18 of cavities 1 and 2 respectively. The next step, shown in FIG. 3, is to establish a straight line 20 through the centers 16 and 18 located in the previous step. In the representation of connector 10 shown in FIG. 3, the cavities 12 are arranged in a horizontal row and, therefore, the line 20 happens to pass through the center of all of the cavities 1 through 5. However, this is not necessarily the case as the openings for cavities 1 through 5 may be distributed over the terminal end surface in an entirely different and non linear way. It is necessary to select the same two cavity numbers; i.e., 1 and 2, to draw line 20. This selection assures consistency regardless of the number of cavities in any given connector.

If the line 20 which is drawn between the two selected cavity centers is not horizontal (it need not be), the next step involves reorienting the line 20 to make it horizontal. This is done by rotating the entire graphic in a direction which requires the least angular travel to reach a horizontal disposition of the line 20.

Figure 4:
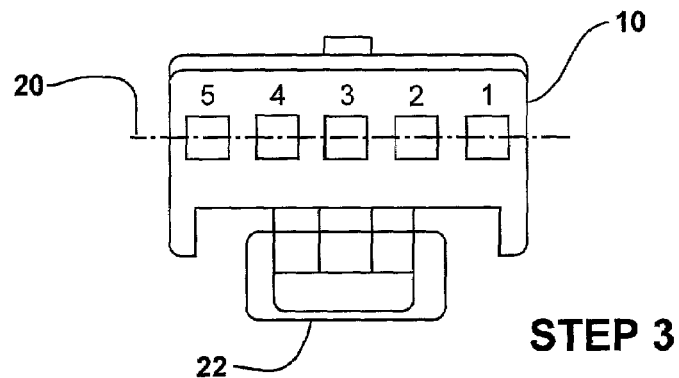
FIG. 4 is a reproduction of the terminal graphic from FIG. 1 after an inverting step to place detail 22 in the lower half of the facsimile.

The next step is shown in FIG. 4. This step involves the identification of the "heavy" side of the connector 10 relative to the line 20 and a rotation of the graphic as necessary to place the heavy side below the horizontal line 20. For the connector 10, the detail 22 puts the heavy side on top when viewed in the orientation of FIGS. 2 and 3. To place the heavy side in the bottom half of the graphic, I rotate the line 20 180° to reach the condition shown in FIG. 4. It will be noted that the cavity location identifying numbers are now reversed; i.e., 5 is on the left and 1 is on the right.

The term "heavy" is used here to denote the portion of the CAD drawing relative to line 20 with the greatest area or, for a three-dimensional representation, the greatest mass.

Figure 5:
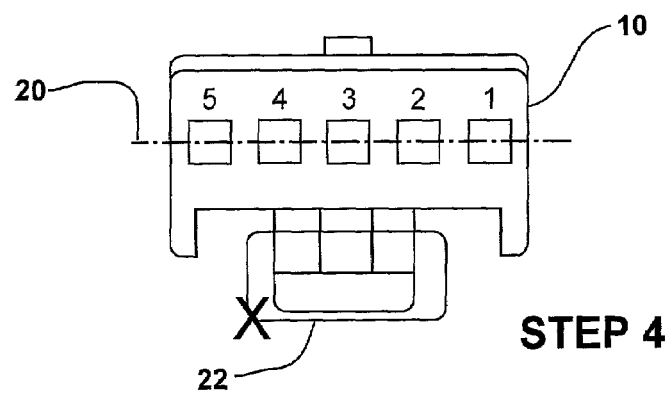
FIG. 5 is a reproduction of the terminal graphic in the inverted condition and with the additional step of locating the origin of a coordinate system to be used in locating cavity centers.

The next step is to impose a coordinate system on the graphic of FIG. 4. As shown in FIG. 5 the first sub-step in achieving this imposition is to find an origin point which is identified in FIGS. 5 and 6 by the large letter "X." The origin should be located where a reliable, repeatable protocol can be used to find it. I have determined that a good repeatable location is the lower left most portion of the graphic after rotation. I find location X by placing the arrow icon on the bottom line of the detail 22 and moving it toward the left until further movement requires the icon to begin to move upwardly. This is the origin point.

Figure 6:
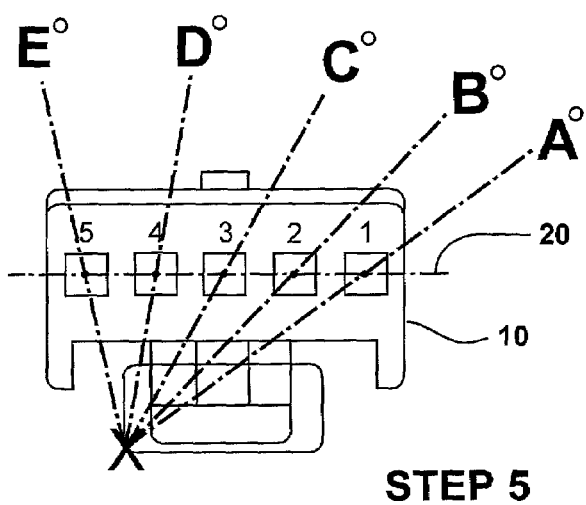
FIG. 6 is a representation of the terminal graphic with the super imposition of a polar coordinate locating system.

The coordinate system which I have selected for finding the coordinates of the center cavities 12 is shown in FIG. 6 as a polar coordinate system. This coordinate system results in numbers for an angle and a distance of the cavity center from the origin X. However Cartesian coordinates also result in a pair of numbers uniquely describing the coordinates of each cavity center. Therefore, Cartesian coordinates may also be used.

FIG. 7 is a highly simplified table of coordinates for the five cavities 12 of the connector 10. These numbers assume that the line at A° is taken as θ=0°. However the 0° radian may also be superimposed on a horizontal line; i.e., a line parallel to line 20 but drawn through the origin X if desired.

While in FIG. 7 the numbers I have selected for the table are degrees for angles and millimeters for distances, I prefer to use a system wherein the full circle is divided in 6,000 units rather than merely 360. This gives me a much higher resolution and a better mathematical result.

The next step is to create an integer using the cavity numerical identifier and the coordinates of the cavity centers. One very simple way to create such a number is to simply write a string of digits serializing the cavity numbers 1 through 5 and in each case following the cavity number by the two coordinate numbers. For example, the numbers from FIG. 7 result in an integer 10102208330744065506. If another user of my protocol had numbered the cavity in the reverse order as a result, for example, of viewing the connector 10 from the wire end, the integer would not be the same as mine despite the fact that all of the coordinates might be identical. His number would, for example, be 15062406330742085010. A simple comparison of the two integers would show that different cavity identification numbering protocols were used and steps would be taken to avoid future problems.

As a practical matter the integers given above purely by way of example are unmanageably long. Therefore it is desirable to perform a mathematical operation on these integers to reduce them to a more manageable length.

As a practical matter I prefer to use a mathematical process involving a simplified cyclical redundancy check or "CRC" algorithm hereinafter defined. This mathematical operation results in a checksum having, for example, five or six digits.

The algorithm which I prefer is the "straightforward CRC implementation" defined by Ross N. Williams in *A Painless*

*Guide to CRC Error Detection Algorithms* (pg. 10; http://www.geocities.com/silicon valley/pines/8659/CRC.htm). An alternative is to simply divide the integer by a prime number. However, because the length of the concatenated string of numbers can vary considerably depending on the number of cavities, the selection of a prime number which fits all situations equally well is not possible.

The final step of my method is shown in FIG. 8 to be a new record which includes the checksum value 121408. Note that this record does not require a graphic component as shown in FIG. 1. The record may be transmitted electronically and maintained only in an electronic file. Alternatively it may be maintained electronically but from time to time converted to paper form.

However unlikely, it is possible that a connector may be perfectly symmetrical and have no heavy side. In this case I add a detail at the 12 o'clock position and rotate it to the bottom. If I do not need to add a detail, I add the code digit "1" to the integer; i.e., it becomes 110102208330744065506. If I add a detail, I add the digit "2" and the integer becomes 210102208330744065506.

Figure 9A:
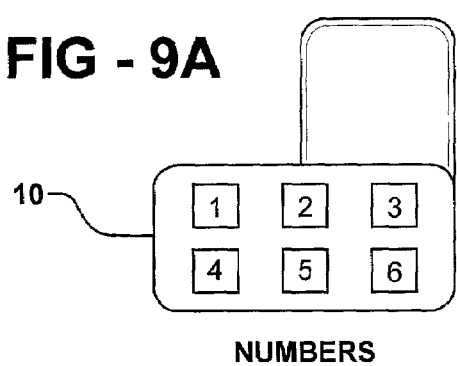
FIGS. 9A, 9B and 9C show alternate representations of a connector graphic.
Figure 9B:
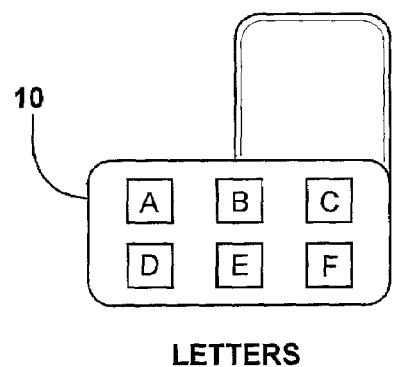
Figure 9C:
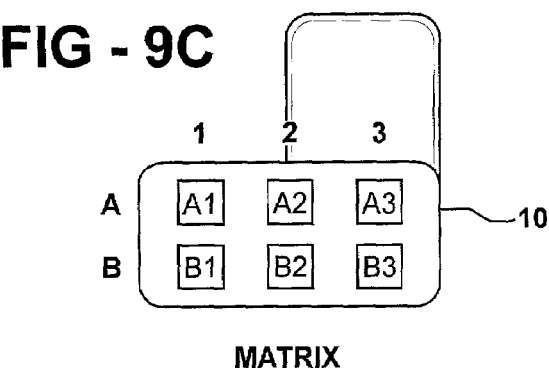

Not all connectors are designed as depicted in FIG. 1. Connectors can have multiple rows and multiple columns of cavities, as well as variations in cavity numbering conventions. Connectors can have numbers, letters, or matrix labeling for cavities as shown in FIGS. 9A, 9B, and 9C. If letters are used to label the cavities, the letters can be converted to numbers simply by A=1, B=2, C=3 . . . Z=26. For a connector labeled via matrix, the conversion for the letter is the same as described above, then the converted letter is concatenated to the corresponding number. For example, if the cavity is numbered C1, first convert C to 3 and then concatenate it with the 1. The resulting label for the cavity is 31.

Figure 10:
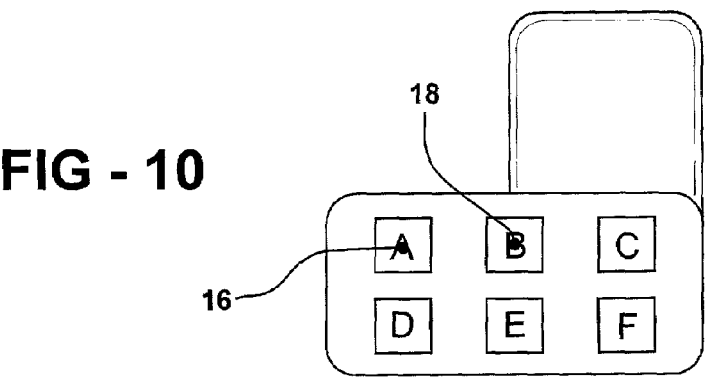
FIG. 10 is a reproduction of the graphic portion of FIG. 9B with the additional step of locating the centers of cavities.
Figure 11:
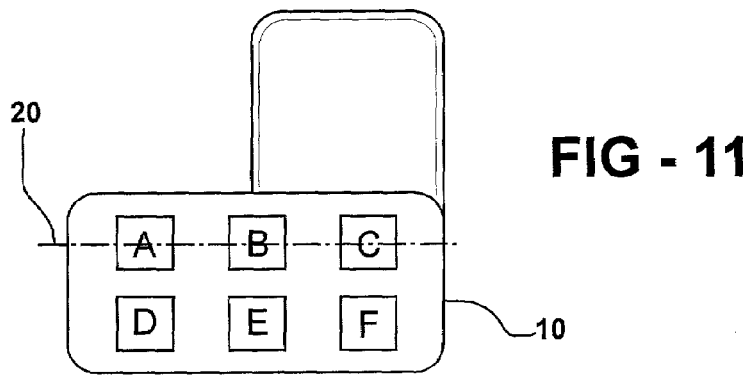
FIG. 11 is a reproduction of the graphic portion of FIG. 9B with the additional step of having drawn a line through the centers of cavities A and B.

Referring now to FIG. 9B, there are six cavities labeled A–F. The first step, as shown in FIG. 10, is to locate the center 16, 18 of cavities A and B. Step 2, as shown in FIG. 11, is to draw line 20 through the center points 16, 18 of cavities A and B. Step 3, as shown in FIG. 12, inverts the graphic so that the center of mass is now located below line 20. Step 4, as shown in FIG. 13, places a large letter "X" at the origin where a reliable, repeatable protocol can be used to find it. Step 5, as shown in FIG. 14, shows a method of locating and defining each cavity center via a polar coordinate system. Use of a polar coordinate system allows the cavity center to be defined as an angle and distance from the origin "X". Step 6, as shown in FIG. 15, places the polar coordinates into a simplified table to define the connector. The table is then converted to an unprocessed integer 101021093228471351611625259. Once again, because this integer is extremely cumbersome, an unprocessed integer can be converted into a processed code through mathematical manipulations. In this instance the illustrative code is 56943512. Other connector embodiments can be converted in similar fashion.

It will be understood that various alternatives and modifications to my method are possible while achieving essentially the same end result; i.e., the generation of a numerical code number which can be placed in the record of a multiple cavity electrical connector as a replacement for a more cumbersome graphic representation of facsimile thereof used at the present time.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of assuring a consistent location of circuits in a connector having multiple circuit-receiving cavities comprising the steps of:
 a. defining a numerical coordinate system;
 b. assigning all of the cavities in a multiple cavity connector different numerical identities;
 c. numerically defining the location of all of the cavities in the defined coordinate system;
 d. concatenating all of the identity numbers and coordinate numbers in a consistent repeatable order to create an integer;
 e. performing a mathematical operation on the integer to produce a checksum; and
 f. creating a record containing an identification of the connector and the checksum.

2. A method as defined in claim 1 wherein the mathematical operation involves the performance of a cyclical redundancy check.

3. The method of claim 1 wherein the record further comprises a table of cavities of the circuits associated therewith.

4. The method of claim 3 wherein the table further includes numerical cavity identifiers.

5. The method of claim 4 wherein the method includes a paper drawing.

6. The method of claim 1 wherein the step of numerically identifying locations of all the cavities in the coordinate system includes creating a full-scale facsimile of the connector within the coordinate system and finding a 0(zero) coordinate position.

7. The method of claim 6 further including the step of drawing an equator between the centers of at least two cavities and orienting the equator such that the largest area of the facsimile is below the equator.

8. The method of claim 6 wherein the coordinate system is polar.

9. The method of claim 1 including the further step of comparing the table record and the checksum number to similar data in another independently generated record.

* * * * *